July 2, 1935. H. J. HORN 2,006,639
SHIELD OR COVER PLATE FOR VEHICLE WHEELS
Filed Jan. 21, 1932
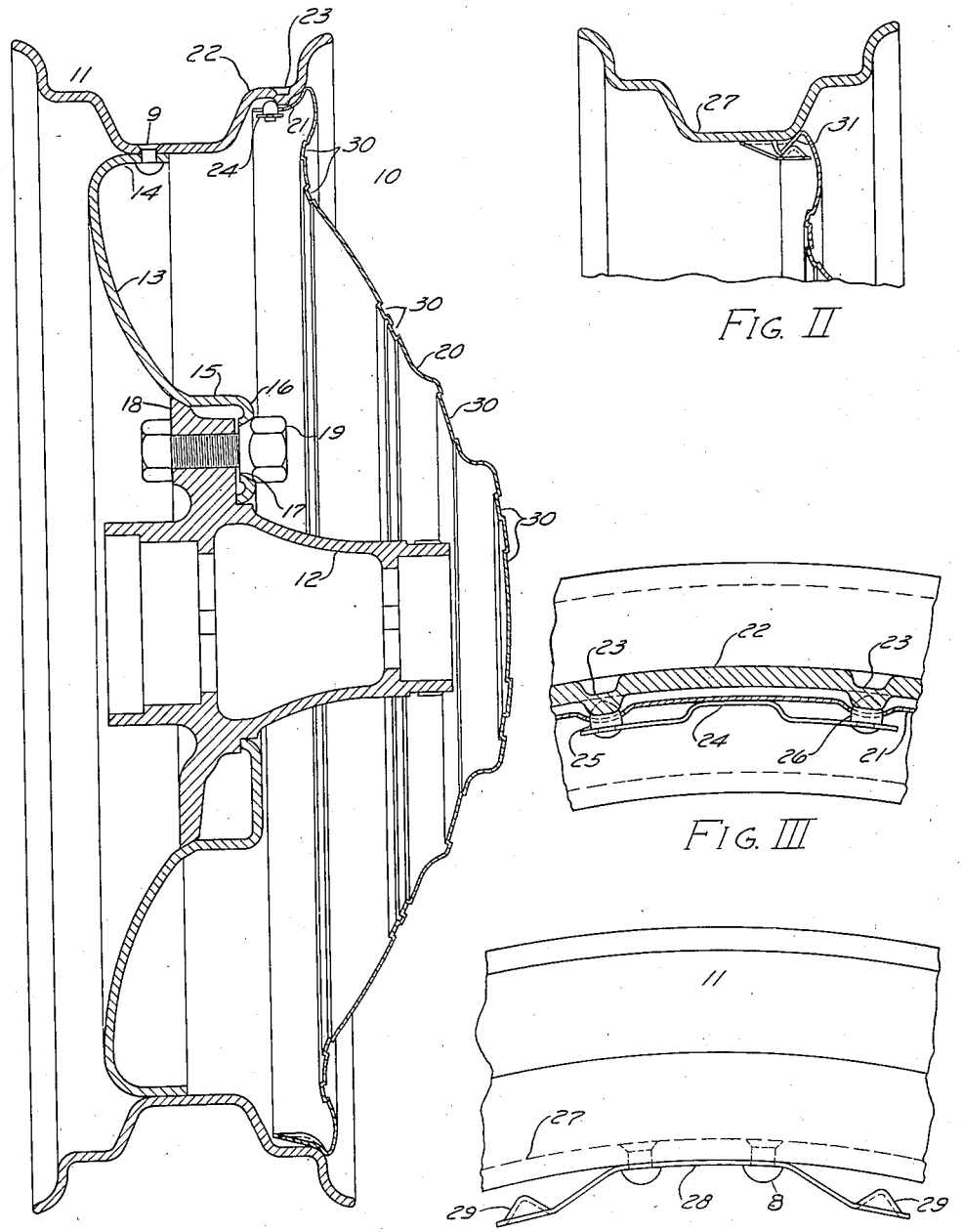
INVENTOR
HARRY J. HORN.
BY Carroll R. Taber
HIS ATTORNEY Patented July 2, 1935

2,006,639

UNITED STATES PATENT OFFICE 2,006,639

SHIELD OR COVER PLATE FOR VEHICLE WHEELS

Harry J. Horn, Lansing, Mich., assignor to Motor Wheel Corporation, Lansing, Mich., a corporation of Michigan Application January 21, 1932, Serial No. 587,859

3 Claims. (Cl. 301—37)

One object of the invention is the provision of means for concealing the unsightly body portion of a vehicle wheel and to eliminate the necessity for dressing up that part of the wheel to present a finished appearance which will harmonize with the rest of the vehicle. Another object is the provision of improved means for securing the shield to the wheel. These objects are attained by securing the periphery of a suitably decorated and shaped shield or cover plate to the rim section of the wheel whereby all of the working parts contained within the rim are concealed from view. Thus the working parts of the wheel assembly may be of such design as is best suited for the performance of their allotted function without regard to appearance.

While it is intended that the shield or cover plate will be used only on that side of the vehicle which is normally exposed to view a modification thereof might be used on the inner side of the wheel also. The shield is preferably formed with means about its periphery whereby it may be removably secured to the rim section of the wheel. This is required in order to permit the removal of the wheel from the vehicle to which it is attached for replacement or repair.

An illustration of a specific form of apparatus embodying the invention is shown in the drawing forming a part of this specification, in which:

Figure I is a cross-sectional view of a vehicle wheel equipped with a shield or cover plate and illustrating one method which may be used for securing the shield to the rim section of the wheel;

Figure II is a fragmentary sectional view of a vehicle wheel illustrating another method by which the shield may be secured to the rim section;

Figure III is a fragmentary sectional view of the rim portion of the wheel shown in Figure I illustrating in detail the means for securing the shield to the rim; and Figure IV is a fragmentary sectional view of the rim portion of a wheel showing in detail the means illustrated in Figure II for securing the shield to the rim.

The wheel 10 embodying the invention is of the disc type and consists of a rim section 11, a hub member 12 and means for operatively connecting the hub member to the rim section comprising a disc 13. It should be understood, however, that the invention is not limited to this particular wheel but is applicable to any other type of wheel utilizing either a fixed or demountable rim member and embodying any of the conventional forms of wheel bodies. The rim section 11 is of the so-called drop center type having axially extending base portions and substantially radially extending side wall portions which is adapted to receive a pneumatic tire directly thereon. The rim may be secured to the flanged periphery 14 of the disc 13 by rivets 9, as shown, or by any other suitable means.

The disc 13 is provided with a central opening therethrough about which it is flanged as indicated at 15 and 16. The flanged portion 16 is provided with a plurality of bolt holes 17. The disc is secured to the hub by means of a plurality of securing bolt and nut assemblies 19, the securing bolts extending through the openings 17 and similar openings provided for that purpose in the annular projection 18. Suitable openings are provided in the hub 12 for the reception of a conventional wheel axis in the usual manner.

It will be observed that the hub shell sometimes utilized in addition to the hub portion proper of the conventional wheel has been dispensed with in the structure illustrated in Figure I. The unfinished appearance of the hub is not objectionable, however, since it is completely concealed from the outside of the wheel by a shield 20. The shield 20 is preferably frusto conical in sape and is provided with a flanged portion 21 about the periphery thereof whereby it may be secured to the rim 11.

The preferred method by which the shield 20 is removably secured to the rim is shown in Figure I wherein the rim section 11 is provided, about that portion 22 thereof which lies in a plane parallel to the axis of the wheel, with a plurality of spaced pairs of indentations 23 and the flanged periphery 21 of the shield 20 is provided with a plurality of leaf spring devices 24 adapted to cooperate with the indentations 23.

As best shown in Figure III, the spring devices 24 consist of a short piece of resilient metal having a depressed central portion and which is provided with openings at its opposite extremities for the reception of a pair of buttons 25. The spring 24 is secured to the under side of the flanged periphery 21 by welding the flat central portion of the spring thereto. Openings 26 through which the buttons 25 project are formed in the flange 21. The openings 26 are spaced about the periphery of the shield 20 so that they will register with the indentations 23 in the portion 22 of the rim 11.

When the shield 20 is properly positioned adjacent the rim 11, it may be secured thereto by pressing it inwardly toward the rim whereupon the buttons 25 are forced away from the flanged periphery of the shield against the tension of the spring 24 until they have passed behind the indentations 23. Once the buttons have been passed behind the indentations 23 they return to the position shown in Figures I and III and securely lock the shield 20 to the rim 11. The shield may be removed readily by pressing the edge thereof outward whereby the buttons 25 are forced past the indentations 23.

An alternative method by which the shield 20 may be secured to the rim 11 is shown in Figures II and IV. As therein shown a plurality of retention devices 28 are secured by means of rivets 8 at intervals about the base portion 27 of the rim 11. Each of the retention devices comprises a resilient strip of metal formed with a flat central portion and having its opposite extremities deflected outwardly and downwardly from the central portion. The extremities of the retention member 28 are provided with raised portions or projections 29. When the retention device 28 is utilized the periphery of the shield 20 is flanged as shown at 31 in Figure II. The shield is secured to the rim by pressing the edge of the flanged portion 31 over the top of the projection 29, after which the projections spring back into their normal position and securely lock the shield to the rim. The shield is, of course, readily removed by pressing the edge thereof outwardly.

In all cases the shield 20 will, of course, be formed of a suitable size to properly fit within that portion of the rim 11 to which it is to be secured. The shield may be provided with a plurality of circular indentations 30 for decorative purposes as shown in Figure I.

The forgeoing illustrations and description of specific embodiments of the invention are for the purpose of illustration only and it should be understood that the invention is not limited thereto but is coextensive with the scope of the appended claims.

I claim:

1. A vehicle wheel including in combination a hub, a rim, a wheel body connecting the hub to the rim, a plurality of resilient strips of metal secured to the rim, each of said strips having its opposite ends offset forwardly and each end being provided with a projection thereon, a disklike shield, and means on the periphery of said shield adapted to be pressed into interlocking engagement between said rim and said projections, whereby to removably attach said shield to said rim.

2. A vehicle wheel including in combination a rim, a plurality of resilient metal strips, each of said strips being secured intermediate its ends to said rim, the end portions of said strips being offset radially and forwardly and provided at their extremities with projections, and a shield having a peripheral flange adapted to be pressed into interlocking engagement behind said projections and between said offset portions and said rim.

3. The combination with a wheel rim and a wheel shield having a peripheral flange of a device for attaching the shield to the rim comprising a resilient strip of metal secured intermediate its ends to the rim, the opposite end portions of said strip being offset radially and forwardly with respect to the body of said strip and having projections at their extremities to provide substantially V-shaped seats for the reception of the peripheral flange of the shield.

HARRY J. HORN.